No. 665,606. Patented Jan. 8, 1901.
C. L. KENNICOTT.
APPARATUS FOR PURIFYING WATER.
(Application filed Oct. 13, 1900.)
(No Model.)
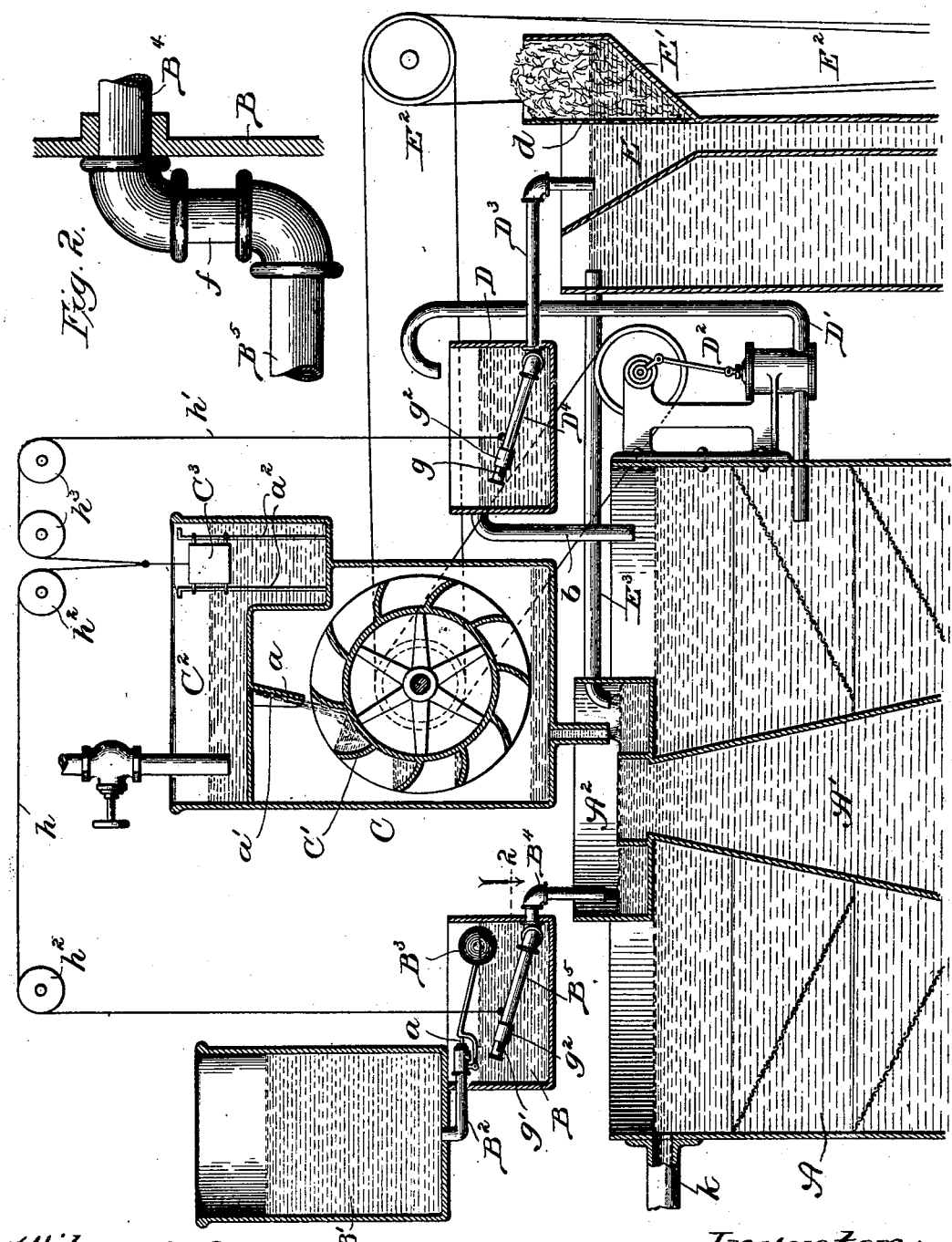
Witnesses:
Inventor:
Cass L. Kennicott,

UNITED STATES PATENT OFFICE.

CASS L. KENNICOTT, OF CHICAGO, ILLINOIS.

APPARATUS FOR PURIFYING WATER.

SPECIFICATION forming part of Letters Patent No. 665,606, dated January 8, 1901.

Application filed October 13, 1900. Serial No. 32,929. (No model.)

*To all whom it may concern:*

Be it known that I, CASS L. KENNICOTT, a citizen of the United States, residing at Chicago, in the county of Cook and State of Illinois, have invented a new and useful Improvement in Apparatus for Purifying Water, of which the following is a specification.

My invention relates particularly to water-purifying apparatus of the character described in Patent No. 646,108, granted to me March 27, 1900. In such apparatus there are commonly employed a "hard-water" tank, a precipitating-tank, and a tank or tanks containing a precipitating agent or agents, a mixing-chamber being commonly provided to receive the hard water and precipitating agents in proper quantities prior to the passage of the mixture into a suitable precipitating-conduit.

My primary object is to provide means whereby the quantity or quantities of chemical agent or agents admitted to the mixture may be automatically varied to correspond accurately with a change in the quantity of water admitted.

My invention is illustrated in its preferred form in the accompanying drawings, in which—

Figure 1 represents in vertical section the upper portion of purifying apparatus constructed in accordance with my improvements, and Fig. 2 a detail of a joint for a swinging pipe-section employed.

A represents a precipitating-tank having a downtake-conduit $A'$; $A^2$, a mixing-chamber surmounting said conduit; B, a chemical-agent (preferably solution of soda) tank; $B'$, a source of supply for the tank B; $B^2$, a supply-pipe leading from the tank $B'$ to the tank B; $B^3$, a float acting on a valve $a$ of the pipe $B^2$ and controlling the depth of solution in the tank B; $B^4$, a pipe leading to the tank $A^2$; $B^5$, a swinging pipe-section jointed to the pipe $B^4$ inside the tank B; C, a motor-chamber; $C'$, a water-wheel therein; $C^2$, a hard-water tank provided with a discharge-spout $a'$; $C^3$, a float movable on guides $a^2$; D, a "soft-water" tank provided with an overflow-pipe $b$, leading to the tank A; $D'$, a supply-pipe for the tank D, communicating with the tank A; $D^2$, a pump geared to the water-wheel $C'$; $D^3$, a discharge-pipe for the tank D; $D^4$, a swinging pipe-section through which water is admitted to the pipe $D^3$; E, a chemical-solution (solution of lime) tank supplied with water from the tank D; $E'$, a chamber for a chemical, (lime,) said chamber having a perforated wall $d$; $E^2$, power-transmission means for connecting a stirrer (not shown) for the tank E with the water-wheel $C'$, and $E^3$ an overflow-pipe for the tank E, which is also a supply-pipe for the chamber $A^2$.

A detail of the connection between the pipe $B^4$ and its movable inlet-section is shown in Fig. 2, a short pipe-section $f$, perpendicular to the section $B^5$, being interposed for the section $B^5$ to swing about. The detail at the pipes $D^3 D^4$ is similar. The pipes $D^4 B^5$ are provided with inlet-orifices $g g'$, respectively, the sizes of which are regulated by adjustable collars $g^2$. Flexible connections $h h'$, passing over suitable pulleys $h^2 h^3$, so join the pipe-sections $D^4 B^5$ to the float $C^3$ that when the float falls the pipe-sections are raised.

It should now be understood that the depth of the orifices $g g'$ below the surfaces of the liquids in the tanks B and D will vary directly with the depth of water in the tank $C^2$. By making the pipes receiving liquid from said orifices of sufficient cross-section to prevent them from becoming filled the columns of liquid above the orifices become the heads of pressure, tending to force liquid from the tanks. Thus it appears that it is possible to automatically secure exactly the same heads of pressure at the discharge-orifices of the tanks B and D as there is at the discharge-orifice of the tank $C^2$.

In operation water to be purified is contained in varying depth in the tank $C^2$. A solution of soda, for instance, of constant depth is maintained in the tank B through the agency of the float-actuated valve $a$, and water is supplied to the tank D by the pump $D^2$ in ample quantity to keep said tank filled to the overflow. Water from the tank $C^2$ actuates the water-wheel in passing to the chamber $A^2$. Lime in lump form is placed in the chamber $E'$. The heads of pressure upon the orifices $g$ and $g'$ are regulated by the float $C^3$ by raising or lowering said orifices, according to the fall or rise of the float. Thus the ratio between the quantities of liquid supplied to the chamber or pan $A^2$ from its three sources remains a constant despite a variation in the total quantity supplied. This evidently is the case, since the liquid passing through the pipe $E^3$ must equal the liquid passing through the pipe $D^3$. The stirring mechanism operated by the transmission means $E^2$ for causing the lime to dissolve more quickly is the same as that illustrated in my former patent. The purified water leaves the tank A at the pipe $k$.

It is obvious that my invention may be embodied in other forms than the one shown. Hence I desire to be understood as intending no limitations by the foregoing detailed description.

The gist of my invention lies, generally stated, in float-actuated means for varying the flow from one supply-source according to a variation in flow from another supply-source, and, more specifically stated, in means for varying the height of the discharge-orifice of one supply-tank according to a change in the liquid-level in another supply-tank.

What I claim as new, and desire to secure by Letters Patent, is—

1. In apparatus of the character described, the combination with a mixing-chamber, a water-supply tank having a discharge-orifice communicating therewith, and a chemical-agent-supply tank having a discharge-orifice communicating with said chamber, of a float actuated with change of level in one of said supply-tanks, and float-actuated means controlled from said float and connected with the other supply-tank for causing a variation in the head of pressure acting upon the discharge-orifice of said last-mentioned tank, substantially as and for the purpose set forth.

2. In water-purifying apparatus, the combination with a mixing-chamber, and a plurality of supply-tanks, one of which has a fixed discharge-orifice, of a float in the tank having said fixed orifice, and a float-actuated member connected with said float and carrying a discharge-orifice for another supply-tank, through the medium of which the head of pressure in the last-named tank is caused to be automatically varied with a variation of the head in the controlling-tank, substantially as and for the purpose set forth.

3. In water-purifying apparatus, the combination with a mixing-chamber, and a plurality of supply-tanks communicating therewith, of a movable pipe-section in one tank provided with a discharge-orifice for said tank and serving to conduct the liquid from said orifice, a float in another of said tanks, and connections between said float and pipe-section, whereby a rise or fall of the float produces an opposite movement of the pipe-section, substantially as and for the purpose set forth.

4. In water-purifying apparatus, the combination with a mixing-chamber, and a plurality of supply-tanks communicating therewith, of a movable pipe-section in one tank provided with a discharge-orifice for said tank and serving to conduct the liquid from said orifice, and means for automatically changing the position of said pipe-section with relation to the level of the liquid wherein it is immersed to cause a variation in the head of pressure when a variation in the amount of discharge from a controlling-tank occurs, substantially as and for the purpose set forth.

5. In water-purifying apparatus, the combination with a mixing-chamber, a hard-water tank, and a chemical-agent tank, of a supply vessel for said last-named tank, a float-controlled valve regulating the passage of liquid from said vessel, a movable member having a discharge-orifice for said last-named tank, a pure-water tank, means for supplying purified water thereto and maintaining a given level therein, a movable member having a discharge-orifice for the pure-water tank, a float in said hard-water tank, regulating the position of said discharge-orifices, a tank for dissolving a second chemical, said dissolving-tank being supplied with water from said pure-water tank, and means of communication between said dissolving-tank and said mixing-chamber, substantially as and for the purpose set forth.

6. In water-purifying apparatus, the combination of a mixing-chamber, a hard-water tank above the same and in communication therewith, a precipitating-tank, a pure-water chamber above the level thereof, means for elevating purified water from the upper portion of the precipitating-tank to said pure-water tank and maintaining a given level in said last-named tank, a dissolving-tank, an overflow-pipe therefor which serves to conduct liquid to said mixing-chamber, a float actuated by change in level in said hard-water tank, a discharge-orifice-bearing part regulated by said float, and a passage from said orifice to said dissolving-tank, substantially as and for the purpose set forth.

7. In water-purifying apparatus, the combination of a mixing-tank, a water-wheel chamber, a water-wheel in said chamber, means of communication between said chamber and said mixing-tank, a hard-water tank above said water-wheel provided with a discharge-orifice leading to said wheel, a float in said hard-water tank, a precipitating-tank beneath said mixing-tank, a soft-water tank above said precipitating-tank, means actuated by said water-wheel for delivering purified water from the upper portion of said precipitating-tank to said pure-water tank, an overflow for said pure-water tank, a dissolving-tank, a discharge-pipe leading from said pure-water tank to said dissolving-tank, a float-actuated movable member provided with a discharge-orifice for said discharge-pipe, and an overflow-pipe for said dissolving-tank communicating with said mixing-tank, substantially as and for the purpose set forth.

8. In water-purifying apparatus, the combination of a precipitating-tank, a mixing-tank surmounting the same, a chemical-solution tank above said mixing-tank provided with a discharge-pipe leading to the mixing-tank, a movable pipe-section for said chemical-solution tank, a water-wheel chamber provided with a discharge leading to the mixing-tank, a wheel therein, a hard-water tank surmounting the water-wheel chamber and provided with a discharge leading to the wheel, a float in said hard-water tank, a soft-water tank located above said precipitating-tank, mechanism geared to said wheel for delivering purified water from the upper portion of said precipitating-tank to said pure-water tank, an overflow for maintaining a given level in said pure-water tank, a dissolving-tank, an overflow-pipe leading from the upper portion of said dissolving-tank to said mixing-tank, a discharge-pipe leading from said pure-water tank to said dissolving-tank, a movable pipe-section provided with an inlet-orifice and in commnuication with said last-named discharge-pipe, and connections between said float and said movable pipe-sections, substantially as and for the purpose set forth.

CASS L. KENNICOTT.

In presence of—
D. W. LEE,
ALBERT D. BACCI.